United States Patent
Paterson et al.

(10) Patent No.: US 7,316,729 B2
(45) Date of Patent: Jan. 8, 2008

(54) AIR CLEANER WITH IMPROVED AIRFLOW

(75) Inventors: Christopher M. Paterson, Biloxi, MS (US); Charles W. Reynolds, Long Beach, MS (US); Owen T. Bourgeois, Pass Christian, MS (US)

(73) Assignee: Oreck Holdings LLC, Cheyenne, WY (US)

( * ) Notice: Subject to any disclaimer, the term of this patent is extended or adjusted under 35 U.S.C. 154(b) by 262 days.

(21) Appl. No.: 11/042,746

(22) Filed: Jan. 25, 2005

(65) Prior Publication Data

US 2006/0162564 A1    Jul. 27, 2006

(51) Int. Cl.
    *B03C 3/011*    (2006.01)
(52) U.S. Cl. ........................ 95/69; 95/70; 95/78; 96/39; 96/55; 96/57; 96/63; 96/94; 96/222
(58) Field of Classification Search ............... 96/39, 96/55–58, 63, 94, 222; 95/69–70, 78
See application file for complete search history.

(56) References Cited

U.S. PATENT DOCUMENTS

| | | | | |
|---|---|---|---|---|
| 4,244,710 A | * | 1/1981 | Burger ............................ | 95/69 |
| 4,261,712 A | | 4/1981 | Kinkaide et al. ............... | 96/58 |
| 4,268,282 A | | 5/1981 | MacKenzie et al. ........... | 96/58 |
| 4,597,781 A | * | 7/1986 | Spector .......................... | 96/52 |
| 5,433,772 A | * | 7/1995 | Sikora ............................ | 96/87 |
| 5,702,507 A | * | 12/1997 | Wang ............................. | 96/55 |
| 6,296,692 B1 | * | 10/2001 | Gutmann ........................ | 96/62 |
| 6,428,611 B1 | | 8/2002 | Andolino et al. .............. | 96/25 |
| 2003/0029319 A1 | * | 2/2003 | Ninomiya et al. ............. | 96/63 |

FOREIGN PATENT DOCUMENTS

| | | | | |
|---|---|---|---|---|
| CA | 1127980 A1 | | 7/1982 | |
| JP | 63-185424 A | * | 8/1988 | ................. 96/222 |
| JP | 10305238 A | | 11/1998 | |
| JP | 2000 325753 A | | 11/2000 | |

* cited by examiner

*Primary Examiner*—Richard L. Chiesa
(74) *Attorney, Agent, or Firm*—The Ollila Law Group LLC

(57) ABSTRACT

An air cleaner is provided according to an embodiment of the invention. The air cleaner includes an air duct including an inlet end and an outlet end, a pre-filter positioned at the inlet end, an electrostatic precipitator positioned in the air duct downstream of the pre-filter, a post-filter positioned in the air duct downstream of the electrostatic precipitator, and a fan unit positioned in the air duct downstream of the post-filter. Airflow travels from the inlet end to the outlet end. The airflow first encounters the pre-filter, encounters the electrostatic precipitator after encountering the pre-filter, encounters the post-filter after encountering the electrostatic precipitator, and encounters the fan unit after encountering the post-filter. Each of the pre-filter, the electrostatic precipitator, and the post-filter can be separately installed and removed from the air duct.

27 Claims, 7 Drawing Sheets

AIR CLEANER WITH IMPROVED AIRFLOW

TECHNICAL FIELD

The present invention relates to a tower air cleaner, and more particularly, to a tower air cleaner with improved airflow.

BACKGROUND OF THE INVENTION

Air cleaners and purifiers are widely used for removing foreign substances from the air. The foreign substances can include pollen, dander, smoke, pollutants, dust, etc. In addition, an air cleaner can be used to circulate room air. An air cleaner can be used in many settings, including at home, in offices, etc.

One type of air cleaner is an electrostatic precipitator. An electrostatic precipitator operates by creating an electrical field. Dirt and debris in the air becomes ionized when it is brought into the electrical field by an airflow. Charged positive and negative electrodes in the electrostatic precipitator air cleaner, such as positive and negative plates, attract the ionized dirt and debris. The electrodes can release the dirt and debris when not powered, and the electrostatic precipitator can be removed and cleaned. Because the electrostatic precipitator comprises electrodes or plates through which airflow can easily and quickly pass, only a low amount of energy is required to generate the airflow. As a result, foreign objects in the air can be efficiently and effectively removed.

FIG. 1 shows one prior art air cleaner 100. The prior art air cleaner 100 includes a pre-filter 101, an electrostatic precipitator 102, a fan unit 103, and a post-filter 104. The pre-filter 101, the electrostatic precipitator 102, the fan unit 103, and the post-filter 104 are independent devices, wherein each component can be independently installed and removed. Airflow through the prior art air cleaner 100 first encounters the pre-filter 101, then the electrostatic precipitator 102, the fan unit 103, and finally the post-filter 104. The pre-filter 101 removes larger objects from the airflow, such as debris that could block or clog the electrostatic precipitator 102. The pre-filter 101 is typically rather coarse, and is designed to minimally impede the incoming airflow. The electrostatic precipitator 102 removes dirt and debris by electrostatic attraction to electrode plates, as previously discussed. The post-filter 104 is typically a fine filter that is designed to remove any small particulate remaining in the airflow.

This prior art air cleaner 100 has drawbacks. The post-filter 104 is located after the fan unit 103. The post-filter 104 is included to remove any dirt and debris that is not removed by the pre-filter 101 and by the electrostatic precipitator 102. Therefore, it is anticipated that some dirt and debris is still in the airflow when it reaches the post-filter 104. As a result, the motor of the fan unit 103 is subjected to the at least partially dirty airflow, causing shortened motor life, shortened bearing life, increased electrical current consumption, increased heating, etc.

FIG. 2 shows another prior art air cleaner 200. This prior art air cleaner 200 includes a filter unit 201 and a fan unit 202. The prior art filter unit 201 can comprise an integral pre-filter, electrostatic precipitator, and post-filter. Any pre-filter, electrostatic precipitator, or post-filter comprising the prior art filter unit 201 cannot be independently installed or removed.

This prior art air cleaner 200 also has drawbacks. The integral nature of the air cleaner 200 is inflexible. Consequently, the prior art air cleaner 200 cannot be assembled with various filter element sizes, capacities, cleaning abilities and cleaning specialties, etc. In addition, the prior art air cleaner 200 cannot allow individual components to be independently removed, cleaned, serviced, replaced, etc. Moreover, the components of the prior art air cleaner 200 form a long air processing segment, and cannot be moved or located according to the physical size or shape of the overall air cleaner.

SUMMARY OF THE INVENTION

An air cleaner is provided according to an embodiment of the invention. The air cleaner comprises an air duct including an inlet end and an outlet end, wherein an airflow travels from the inlet end to the outlet end. The air cleaner further comprises a pre-filter positioned at the inlet end, wherein the airflow first encounters the pre-filter. The air cleaner further comprises an electrostatic precipitator positioned in the air duct downstream of the pre-filter. The airflow encounters the electrostatic precipitator after encountering the pre-filter. The air cleaner further comprises a post-filter positioned in the air duct downstream of the electrostatic precipitator. The airflow encounters the post-filter after encountering the electrostatic precipitator. The air cleaner further comprises a fan unit positioned in the air duct downstream of the post-filter. The airflow encounters the fan unit after encountering the post-filter. Each of the pre-filter, the electrostatic precipitator, and the post-filter can be separately installed and removed from the air duct.

An air cleaner is provided according to an embodiment of the invention. The air cleaner comprises an air duct including an inlet end and an outlet end, wherein an airflow travels from the inlet end to the outlet end. The air cleaner further comprises a removable pre-filter positioned at the inlet end. The airflow first encounters the pre-filter. The air cleaner further comprises a removable electrostatic precipitator positioned in the air duct downstream of the pre-filter. The airflow encounters the electrostatic precipitator after encountering the pre-filter. The air cleaner further comprises a removable post-filter positioned in the air duct downstream of the electrostatic precipitator. The airflow encounters the post-filter after encountering the electrostatic precipitator. The air cleaner further comprises a fan unit positioned in the air duct downstream of the post-filter. The airflow encounters the fan unit after encountering the post-filter. Each of the pre-filter, the electrostatic precipitator, and the post-filter can be separately installed and removed from the air duct.

A method of providing an air cleaner is provided according to an embodiment of the invention. The method comprises generating an airflow in an air duct that includes an inlet end and an outlet end. The airflow travels from the inlet end to the outlet end. The method further comprises passing the airflow through a pre-filter located in the air duct, passing the airflow through an electrostatic precipitator located in the air duct downstream of the pre-filter, passing the airflow through a post-filter located in the air duct downstream of the electrostatic precipitator, and passing the airflow through a fan unit located in the air duct downstream of the post-filter. The fan unit generates the airflow. Each of the pre-filter, the electrostatic precipitator, and the post-filter can be separately installed and removed from the air duct.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 3-7 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
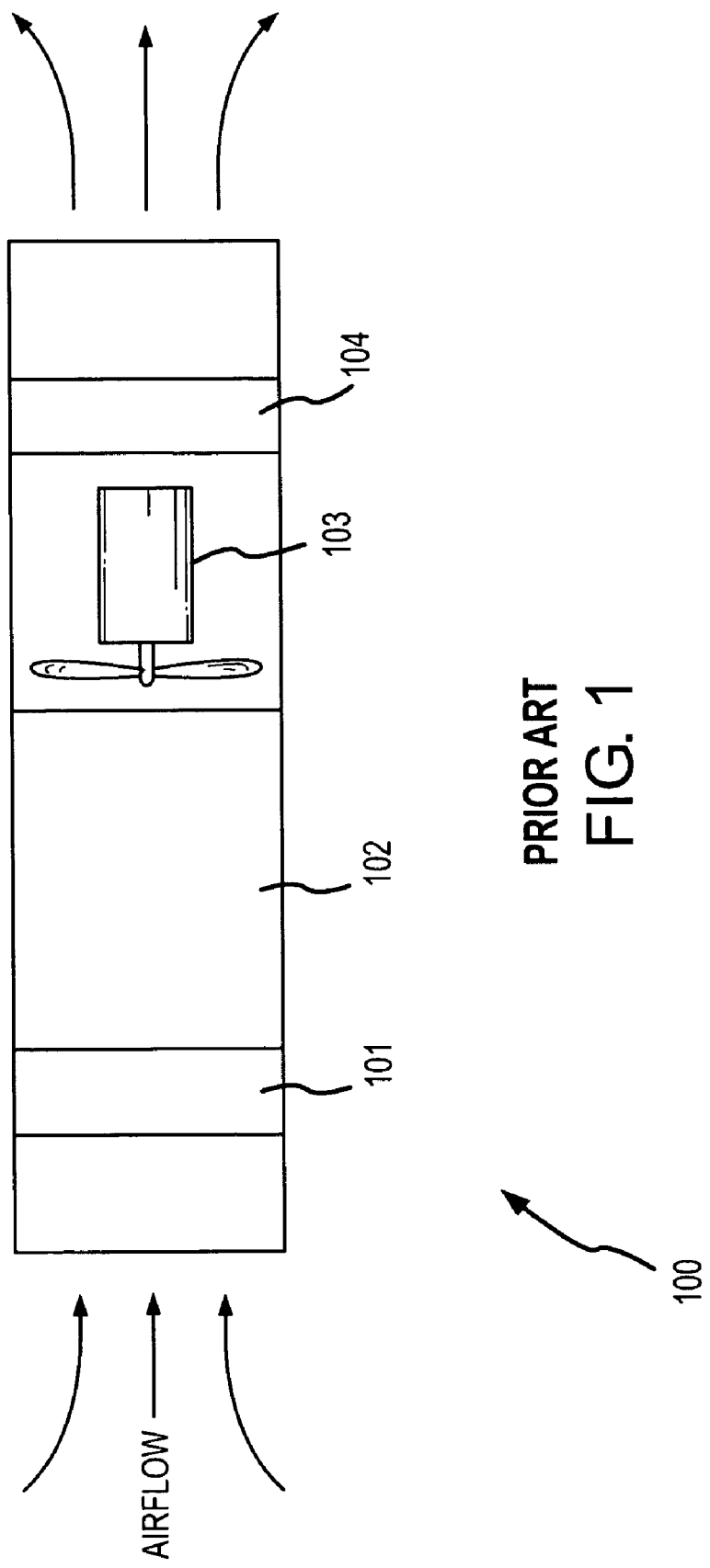
FIG. 1 shows one prior art air cleaner.
Figure 2:
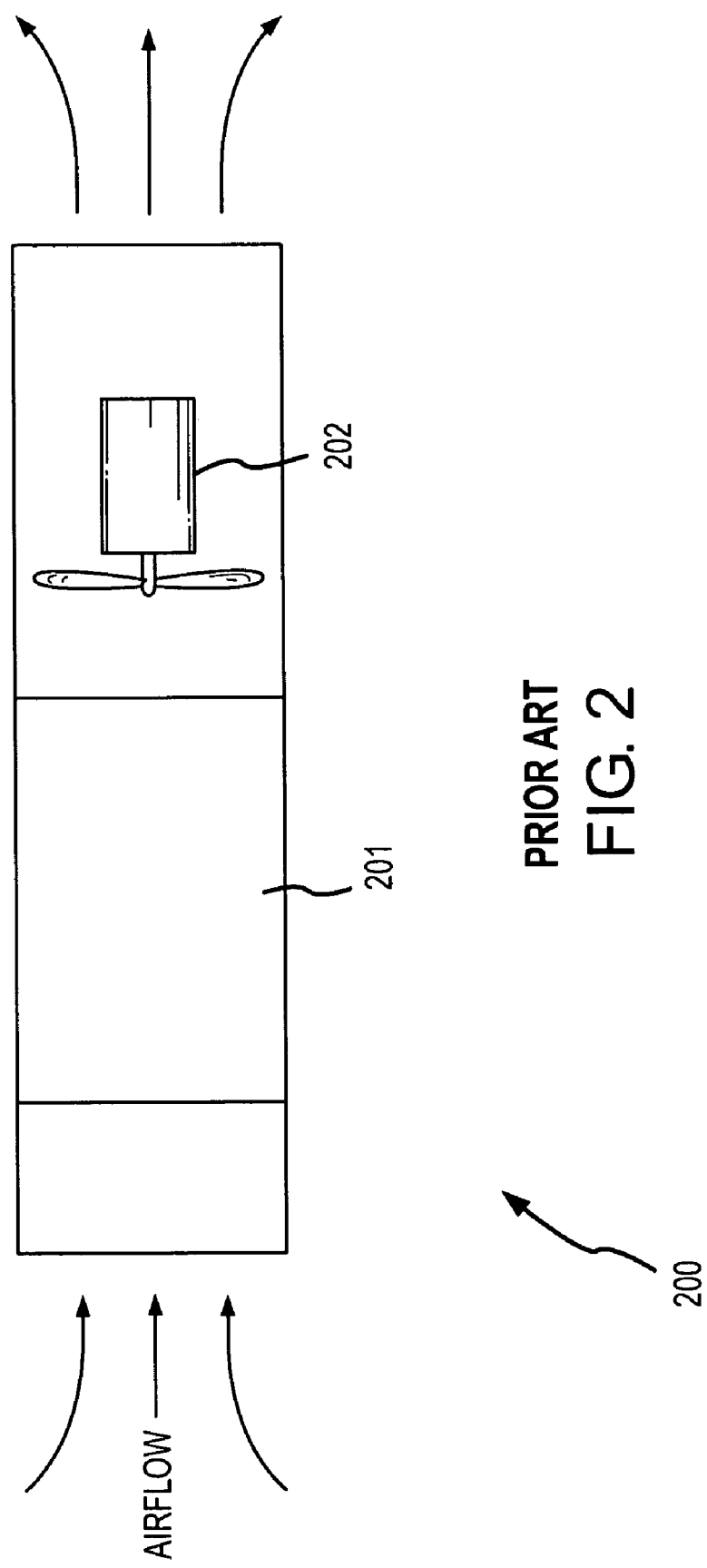
FIG. 2 shows another prior art air cleaner.
Figure 3:
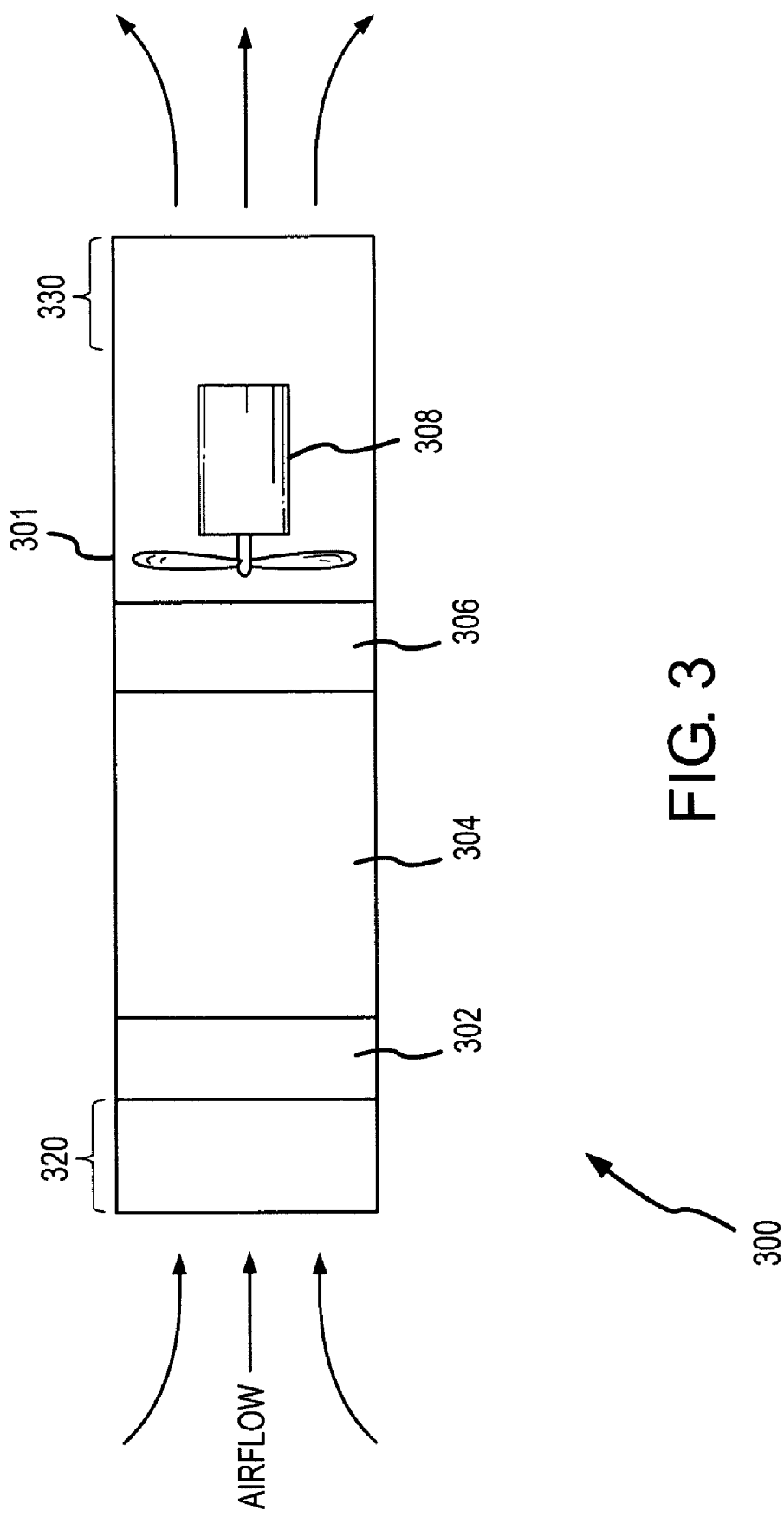
FIG. 3 shows an air cleaner unit according to an embodiment of the invention.

FIG. 3 shows an air cleaner unit 300 according to an embodiment of the invention. The air cleaner unit 300 in one embodiment comprises a component of a tower air cleaner 400 (see FIG. 4). The air cleaner unit 300 includes an air duct 301 having an inlet end 320 and an outlet end 330, a pre-filter 302, an electrostatic precipitator 304, a post-filter 306, and a fan unit 308 all located in the air duct 301.

Airflow through the air cleaner unit 300 enters the inlet end 320 and first encounters the pre-filter 302. The airflow encounters the electrostatic precipitator 304 after encountering the pre-filter 302. The airflow encounters the post-filter 306 after encountering the electrostatic precipitator 304. The airflow encounters the fan unit 308 after encountering the post-filter 306.

The pre-filter 302, the electrostatic precipitator 304, the post-filter 306, and the fan unit 308 are independent units. The pre-filter 302, the electrostatic precipitator 304, the post-filter 306, and the fan unit 308 can comprise removable units that are removably mounted in the air duct 301. Due to the independent nature of the pre-filter 302, the electrostatic precipitator 304, and the post-filter 306, each component can be independently installed and can be independently removed. In addition, the air cleaner unit 300 can be assembled into various configurations by selection of the components for a particular application.

Figure 5:
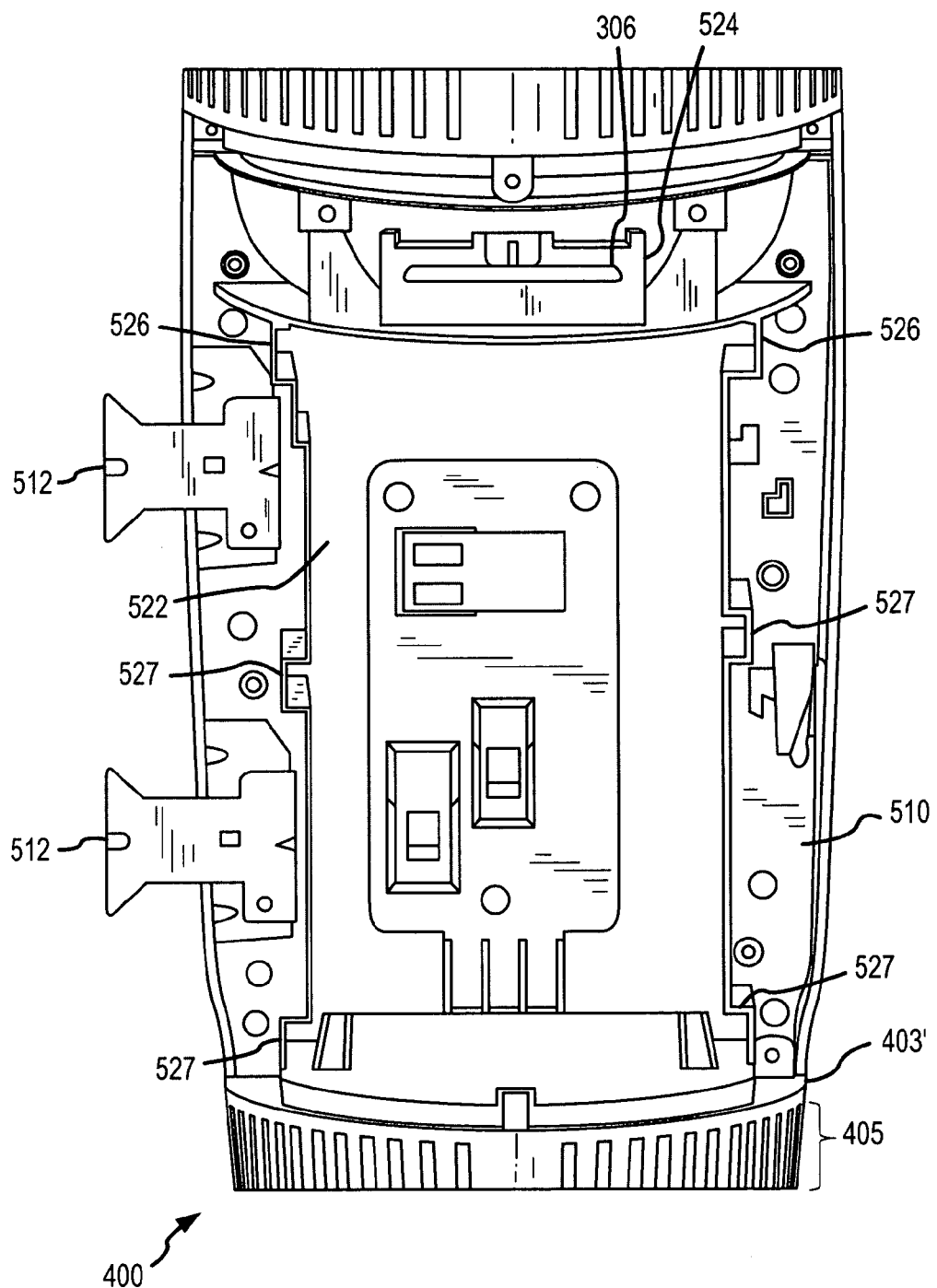
FIG. 5 shows a portion of the air cleaner according to an embodiment of the invention.

The pre-filter 302, the electrostatic precipitator 304, and the post-filter 306 can be received in an air cleaner chassis or frame by some manner of receptacle, slot(s), rail(s), etc., and can be easily and quickly inserted and removed (see FIG. 5). In one embodiment, the pre-filter 302 is received in a pre-filter receptacle 520 in the air duct 301. In one embodiment, the electrostatic precipitator 304 is received in an electrostatic precipitator receptacle 522 in the air duct 301. In one embodiment, the post-filter 306 is received in a post-filter receptacle 524 in the air duct 301.

In one embodiment, the various receptacles can comprise drop-in receptacles. Alternatively, the various receptacles can comprise slide-in receptacles. It should be understood that other receptacle configurations are contemplated and are within the scope of the description and claims.

The electrostatic precipitator receptacle 522 can hold the electrostatic precipitator 304 in a substantially vertical position. Alternatively, the electrostatic precipitator receptacle 522 can hold the electrostatic precipitator 304 at an angle. For example, the electrostatic precipitator 304 can be retained at a small backwards angle (i.e., the electrostatic precipitator 304 is not completely vertical). Consequently, the electrostatic precipitator 304 will not fall out of the electrostatic precipitator receptacle 522 when not clamped or latched to the air cleaner unit 300.

The pre-filter 302 can comprise any manner of desired filter element. In one embodiment, the pre-filter 302 comprises a fiber, a mesh, or a woven filter, for example. The pre-filter 302 can comprise a High Efficiency Particulate Air (HEPA) filter (typically able to remove particulate down to about 0.3 micron in diameter), an allergen air filter, an electrostatic air filter, a charcoal filter, an anti-microbial filter, etc. In addition, the pre-filter 302 can be treated with a germicide, fungicide, bactericide, insecticide, etc., in order to kill germs, mold, bacteria, viruses, and other airborne living organisms (including microorganisms).

The electrostatic precipitator 304 removes dirt and debris from the airflow by electrostatic attraction. The electrostatic precipitator 304 can typically be removed and cleaned. An electrostatic precipitator operates by creating a high voltage electrical field. Dirt and debris in the air becomes ionized when it is brought into the electrical field by an airflow. Charged electrodes in the electrostatic precipitator air cleaner, such as positive and negative plates or positive and grounded plates, attract the ionized dirt and debris. Because the electrostatic precipitator comprises electrodes or plates through which airflow can easily and quickly pass, only a low amount of energy is required to generate the airflow. As a result, foreign objects in the air can be efficiently and effectively removed.

The post-filter 306 can comprise any manner of desired filter element. In one embodiment, the post-filter 306 comprises a fiber, a mesh, or a woven filter, for example. The post-filter 306 can comprise a HEPA filter, an allergen air filter, an electrostatic air filter, a charcoal filter, or an anti-microbial filter, as previously described. As before, the post-filter 306 can be treated with a germicide, fungicide, bactericide, insecticide, etc.

The post-filter 306 can include an odor filtration element. For example, the post-filter 306 can include some manner of carbon, zeolite, or potassium permanganate filter or filter component for odor removal. In addition, the post-filter 306 can include an odor emitting element. For example, the post-filter 306 can include a perfume packet or cartridge portion that emits a desired perfume (or other scent). Therefore, the post-filter 306 can comprise one or more of a mechanical filter element, an odor filtration element, and an odor emitting element.

The fan unit 308 can comprise a motor and impeller designed to create the airflow. It should be understood that the motor and impeller can be chosen according to any manner of design and operational requirements. The fan unit 308 can be controlled in order to create and regulate the airflow. The fan unit 308 can be affixed to any manner of mount (not shown) in the air duct 301. The fan unit 308 can be removably or permanently affixed to the mount.

Figure 4:
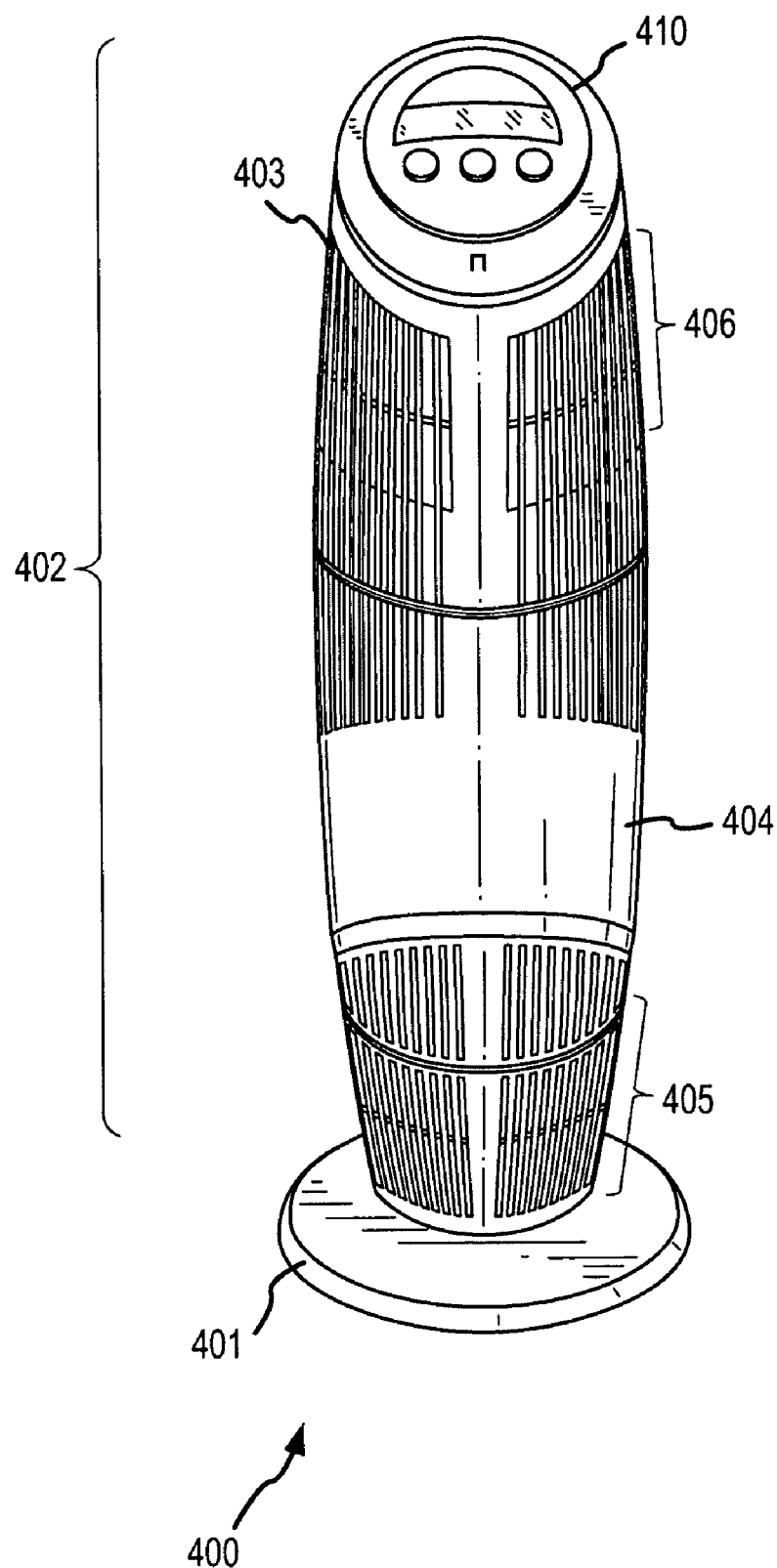
FIG. 4 shows a tower air cleaner according to an embodiment of the invention.

FIG. 4 shows a tower air cleaner 400 according to an embodiment of the invention. The tower air cleaner 400 includes a base portion 401 and a tower portion 402. The tower portion 402 can be generally vertically positioned and elongate in shape. In one embodiment, the tower portion 402 can be substantially cylindrical in shape. The tower portion 402 includes a shell 403, one or more doors 404, and a control panel 410. The tower portion 402 further includes an air inlet 405 and an air outlet 406. Air is drawn in through the air inlet 405, is cleaned inside the tower portion 402, and the cleaned air is exhausted from the air outlet 406. The tower portion 402 can include the air duct 301, wherein the air duct 301 extends substantially vertically between the air inlet 405 and the air outlet 406.

As seen in FIG. 4, the air inlet 405 can comprise a substantially 360 degree inlet, wherein the inlet airflow travels substantially radially into the air inlet 405 and through the sides of the pre-filter 302. The exhausted, cleaned air can travel substantially radially outward from the air outlet 406. The exhausted, cleaned air can travel substantially horizontally or can be exhausted at an angle from horizontal.

The air inlet 405 is shown as being at the lower end of the tower portion 402. However, it should be understood that alternatively the relative positions of the air inlet 405 and the air outlet 406 could be interchanged.

FIG. 5 shows a portion of the air cleaner 400 according to an embodiment of the invention. In the embodiment shown, the air cleaner 400 implements the air cleaner unit 300 in the tower air cleaner 400 of FIG. 4. Other air cleaner configurations are contemplated and are within the scope of the description and claims. In the embodiment shown, an electrostatic precipitator receptacle 522 is formed by the various components of the air cleaner 400 and is analogous to the air duct 301. It should be understood that the air duct 301 (and the components of the air duct 301 as previously discussed) can be used in other air cleaner arrangements.

The air cleaner 400 in this embodiment includes a first shell portion 403', a tower frame 510, and can include a door 404 (not shown) that attaches to the hinges 512. In addition, the air cleaner 400 includes receptacles for the various components, including a pre-filter receptacle (behind the air inlet 405), the electrostatic precipitator receptacle 522, and a post-filter receptacle 524. Furthermore, the air cleaner 400 includes a mount (not shown) for receiving the fan unit 308.

In one embodiment, the pre-filter receptacle 520 (see FIG. 7) comprises an open volume, wherein the pre-filter 302 sets on a supporting surface, with angled or vertical side panels that are presented to the air inlet 405. Alternatively, the pre-filter receptacle 520 can comprise a drop-in or slide-in receptacle, for example, wherein the pre-filter 302 fits to some manner of rails, grooves, pins, etc., which receive and retain the pre-filter 302. In the embodiment of the air cleaner 400 shown in FIG. 7, the pre-filter 302 has a three-dimensional shape and therefore drops into and is retained in the pre-filter receptacle 520. In one embodiment, the pre-filter 302 can have a coffee filter or basket shape, with the top edge comprising a substantially square opening and with the sides being at least partially vertical and tapering down to a joined seam or to a flat bottom surface. Such a pre-filter design maximizes filter surface area and therefore reduces a pressure drop.

Referring again to FIG. 5, the electrostatic precipitator receptacle 522 can comprise a drop-in or slide-in receptacle, for example, wherein the electrostatic precipitator 304 fits to some manner of rails, grooves, pins, etc., which receive and retains the electrostatic precipitator 304. In the embodiment of the air cleaner 400 shown in the figure, support projections 604 (see FIG. 6 and the accompanying discussion) slide into the support projection channels 526. The electrostatic precipitator 304 is therefore held in the electrostatic precipitator receptacle 522 by the support projections 604 in cooperation with the support projection channels 526. As a result, the electrostatic precipitator 304 is retained in the electrostatic precipitator receptacle 522. The retention can alternatively be achieved by the door 404 when the door 404 is closed to the first shell portion 403'. In yet another alternative, the electrostatic precipitator 304 can include some manner of retaining mechanism (not shown) that removably affixes the electrostatic precipitator 304 in the electrostatic precipitator receptacle 522.

The post-filter receptacle 524 can comprise a drop-in or slide-in receptacle, for example, wherein the post-filter 306 (or some manner of post-filter system) fits to some manner of rails, grooves, pins, etc., which receive and retain the post-filter 306. In the embodiment of the air cleaner 400 shown in the figure, the post-filter 306 slides into the electrostatic post-filter receptacle 524.

Figure 6:
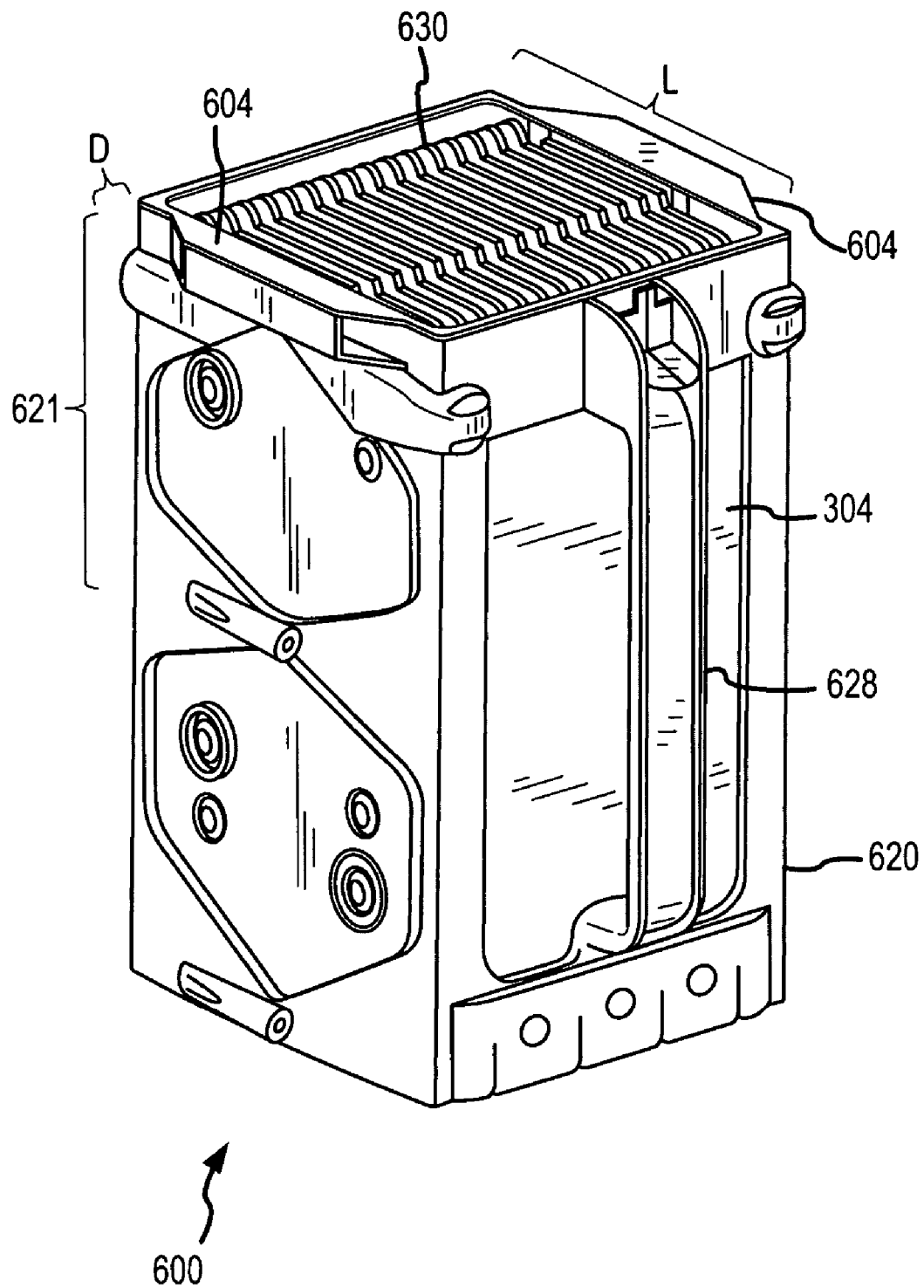
FIG. 6 shows an electrostatic precipitator assembly according to an embodiment of the invention.

FIG. 6 shows an electrostatic precipitator assembly 600 according to an embodiment of the invention. The electrostatic precipitator assembly 600 includes the electrostatic precipitator 304 held within a frame 620. This figure shows at least some of the charge and collection plates 630 that make up the electrostatic precipitator 304.

The frame 620 in one embodiment includes support projections 604 that slide into and are received by the support projection channels 526 of the air cleaner 400 (see FIG. 5). The support projections 604 can therefore be used by the chassis 510 of the air cleaner 500 in order to hold, retain, and steady the electrostatic precipitator assembly 600. Such a hanging design allows a gap between the top of the cell and the inlet to the fan unit to be minimized. This advantageously allows less by-pass of the airflow around the post-filter 306 and achieves better cleaning of the airflow.

The support projections 604 can comprise projections formed on the frame 620. In one embodiment, the support projections 604 are formed substantially at a top region 621 of the frame 620. However, it should be understood that the support projections 604 can be located anywhere on the frame 620. The support projections 604 can comprise projections that have an outward dimension D and a length L. The frame 620 can also include a handle 628. The handle 628 enables the electrostatic precipitator assembly 600 to be gripped for insertion and removal in the air cleaner 500. In addition, the frame 620 can include some manner of retaining mechanism (not shown) that removably affixes the electrostatic precipitator assembly 600 in the electrostatic precipitator receptacle 522.

Figure 7:
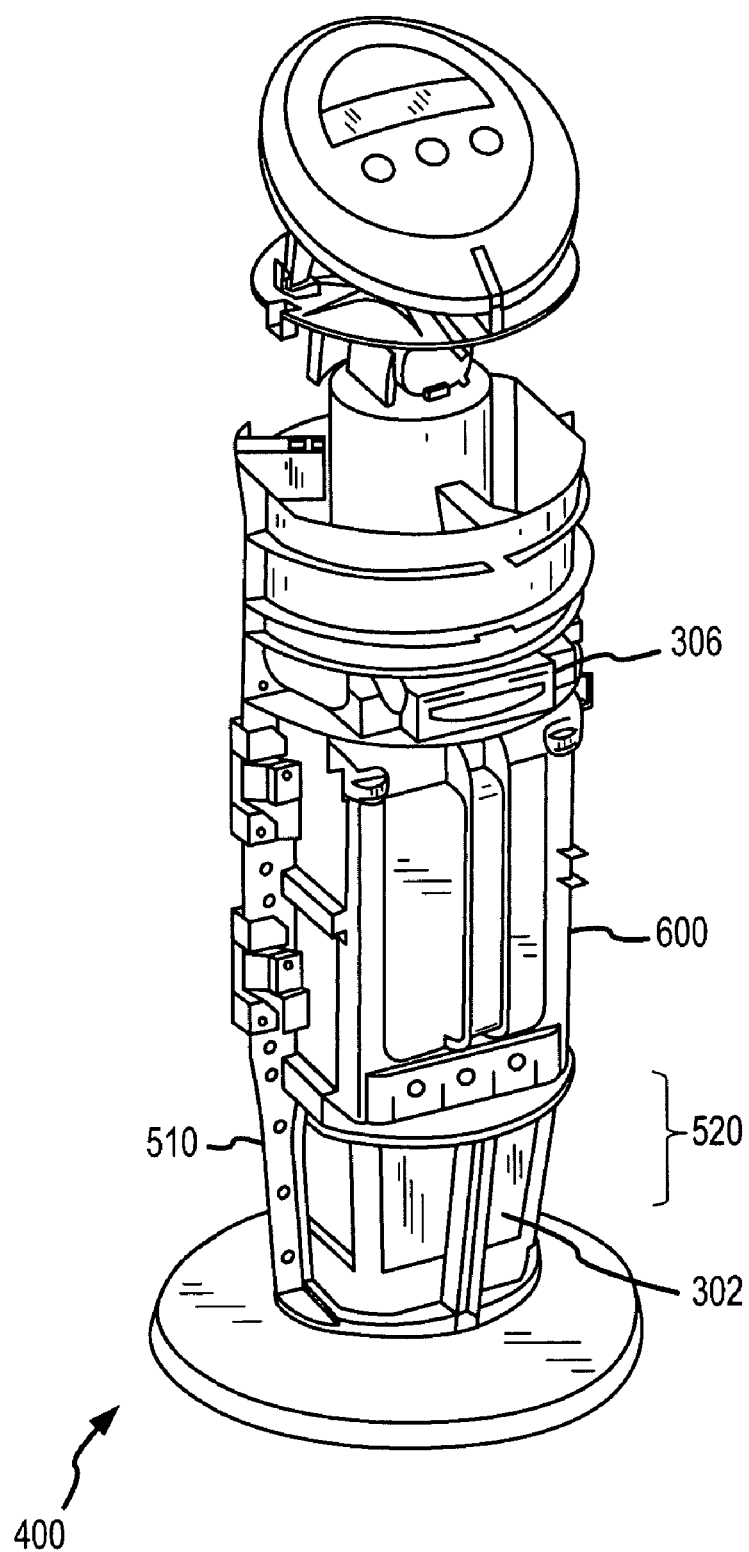
FIG. 7 shows the electrostatic precipitator assembly inserted into a frame of the air cleaner according to an embodiment of the invention.

FIG. 7 shows the electrostatic precipitator assembly 600 inserted into the tower frame 510 of the air cleaner 400 according to an embodiment of the invention. The figure shows the air cleaner 400 where the electrostatic precipitator assembly 600 is fully and completely inserted into the tower frame 510. The figure also shows a pre-filter 302 and a post-filter 306 installed in the pre-filter receptacle 520 and the post filter receptacle. The door or doors 404 are not shown. The door or doors 404, when installed, can operate to retain the electrostatic precipitator assembly 600 in the tower frame 510. In addition, when the electrostatic precipitator assembly 600 is fully inserted, electrical contacts of the electrostatic precipitator assembly 600 can contact corresponding electrical contacts in the tower frame 510 in order to obtain electrical power for the electrostatic precipitator 304 and for the fan unit 308.

The air cleaner according the invention can be implemented according to any of the embodiments in order to obtain several advantages, if desired. The invention can provide an effective and efficient air cleaner. Advantageously, the independent components enable the installation and removal of components. For example, the components can be selected and added in order to obtain a special or custom configuration of the air cleaner. In addition, the airflow will be optimally cleaned before reaching the fan unit, extending motor life and lowering operating costs.

What is claimed is:

1. An air cleaner, comprising:
   a base portion;
   an elongated tower portion extending substantially vertically above the base portion and including a shell, at least one door, and a control panel;
   a substantially vertical air duct inside the tower portion and including an inlet end and an outlet end, wherein an airflow travels in a substantially vertical fashion from the inlet end to the outlet end;
   a pre-filter positioned at the inlet end, wherein the airflow first encounters the pre-filter;
   an electrostatic precipitator positioned in the air duct downstream of the pre-filter, wherein the airflow encounters the electrostatic precipitator after encountering the pre-filter;
   a post-filter positioned in the air duct downstream of the electrostatic precipitator, wherein the airflow encounters the post-filter after encountering the electrostatic precipitator; and
   a fan unit positioned in the air duct downstream of the post-filter, wherein the airflow encounters the fan unit after encountering the post-filter;
   wherein each of the pre-filter, the electrostatic precipitator, and the post-filter can be separately installed and removed from the air duct.

2. The air cleaner of claim 1, wherein the pre-filter is removably mounted in the air duct.

3. The air cleaner of claim 1, wherein the electrostatic precipitator is removably mounted in the air duct.

4. The air cleaner of claim 1, wherein the post-filter is removably mounted in the air duct.

5. The air cleaner of claim 1, wherein the pre-filter is received by a pre-filter receptacle located in the air duct.

6. The air cleaner of claim 1, wherein the electrostatic precipitator is received by an electrostatic precipitator receptacle located in the air duct.

7. The air cleaner of claim 1, wherein the electrostatic precipitator is received by a non-vertical electrostatic precipitator receptacle located in the air duct.

8. The air cleaner of claim 1, wherein the post-filter is received by a post-filter receptacle located in the air duct.

9. The air cleaner of claim 1, wherein the post-filter includes an odor filtration element.

10. The air cleaner of claim 1, wherein the post-filter includes an odor emitting element.

11. An air cleaner, comprising:
    a base portion;
    an elongate tower portion extending substantially vertically above the base portion and including a shell, at least one door, and a control panel;
    a substantially vertical air duct inside the tower portion and including an inlet end and an outlet end, wherein an airflow travels in a substantially vertical fashion from the inlet end to the outlet end;
    a removable pre-filter positioned at the inlet end, wherein the airflow first encounters the pre-filter;
    a removable electrostatic precipitator positioned in the air duct downstream of the pre-filter, wherein the airflow encounters the electrostatic precipitator after encountering the pre-filter;
    a removable post-filter positioned in the air duct downstream of the electrostatic precipitator, wherein the airflow encounters the post-filter after encountering the electrostatic precipitator; and
    a fan unit positioned in the air duct downstream of the post-filter, wherein the airflow encounters the fan unit after encountering the post-filter;
    wherein each of the pre-filter, the electrostatic precipitator, and the post-filter can be separately installed and removed from the air duct.

12. The air cleaner of claim 11, wherein the pre-filter is received by a pre-filter receptacle located in the air duct.

13. The air cleaner of claim 11, wherein the electrostatic precipitator is received by an electrostatic precipitator receptacle located in the air duct.

14. The air cleaner of claim 11, wherein the electrostatic precipitator is received by a non-vertical electrostatic precipitator receptacle located in the air duct.

15. The air cleaner of claim 11, wherein the post-filter is received by a post-filter receptacle located in the air duct.

16. The air cleaner of claim 11, wherein the post-filter includes an odor filtration element.

17. The air cleaner of claim 11, wherein the post-filter includes an odor emitting element.

18. A method of providing an air cleaner with a base portion and an elongated tower portion extending substantially vertically above the base portion and including a shell, at least one door, and a control panel, the method further comprising:
    generating an airflow in a substantially vertical air duct inside the tower portion that includes an inlet end and an outlet end, wherein the airflow travels in a substantially vertical fashion from the inlet end to the outlet end;
    passing the airflow through a pre-filter located in the air duct;
    passing the airflow through an electrostatic precipitator located in the air duct downstream of the pre-filter;
    passing the airflow through a post-filter located in the air duct downstream of the electrostatic precipitator; and
    passing the airflow through a fan unit located in the air duct downstream of the post-filter, with the fan unit generating the airflow;
    wherein each of the pre-filter, the electrostatic precipitator, and the post-filter can be separately installed and removed from the air duct.

19. The method of claim 18, wherein the pre-filter is removably mounted in the air duct.

20. The method of claim 18, wherein the electrostatic precipitator is removably mounted in the air duct.

21. The method of claim 18, wherein the post-filter is removably mounted in the air duct.

22. The method of claim 18, wherein the pre-filter is received by a pre-filter receptacle located in the air duct.

23. The method of claim 18, wherein the electrostatic precipitator is received by an electrostatic precipitator receptacle located in the air duct.

24. The method of claim 18, wherein the electrostatic precipitator is received by a non-vertical electrostatic precipitator receptacle located in the air duct.

25. The method of claim 18, wherein the post-filter is received by a post-filter receptacle located in the air duct.

26. The method of claim 18, wherein the post-filter includes an odor filtration element.

27. The method of claim 18, wherein the post-filter includes an odor emitting element.

* * * * *